United States Patent [19]
Allon et al.

[11] Patent Number: 5,539,883
[45] Date of Patent: Jul. 23, 1996

[54] LOAD BALANCING OF NETWORK BY MAINTAINING IN EACH COMPUTER INFORMATION REGARDING CURRENT LOAD ON THE COMPUTER AND LOAD ON SOME OTHER COMPUTERS IN THE NETWORK

[75] Inventors: David Allon, Jerusalem; Moshe Bach, Haifa; Yosef Moatti, Haifa; Abraham Teperman, Haifa, all of Israel

[73] Assignee: International Business Machines Corporation, Armonk, N.Y.

[21] Appl. No.: 231,352

[22] Filed: Apr. 20, 1994

Related U.S. Application Data

[63] Continuation of Ser. No. 968,713, Oct. 30, 1992, abandoned.

[30] Foreign Application Priority Data

Oct. 31, 1991 [IL] Israel .................................. 099923
Sep. 8, 1992 [EP] European Pat. Off. ............. 92308137

[51] Int. Cl.⁶ .................................................. G06F 13/00
[52] U.S. Cl. ........................ 395/200.11; 395/650; 370/17; 364/222.2; 364/281; 364/284.4; 364/DIG. 1
[58] Field of Search ................................ 370/60, 94, 85.5, 370/85.6, 17; 395/650, 200.02, 200.10, 200.11

[56] References Cited

U.S. PATENT DOCUMENTS

| | | | |
|---|---|---|---|
| 4,633,387 | 12/1986 | Hartung et al. | 395/650 |
| 4,748,558 | 5/1988 | Hirosawa et al. | 395/650 |
| 4,811,337 | 3/1989 | Hart | 370/85 |
| 5,031,089 | 7/1991 | Liu et al. | 395/200.06 |
| 5,053,950 | 10/1991 | Naganuma et al. | 395/650 |
| 5,115,505 | 5/1992 | Bishop et al. | 395/650 |
| 5,150,360 | 9/1992 | Perlman et al. | 370/94.3 |
| 5,155,858 | 10/1992 | DeBruler et al. | 395/800 |
| 5,241,677 | 8/1993 | Naganuma et al. | 395/650 |
| 5,283,897 | 2/1994 | Georgiadias | 395/650 |

OTHER PUBLICATIONS

Bowen, Nikolaou, Ghafoor, On the Assignment Problem of Arbitrary Process Systems to Heterogeneous Distributed Computer Systems, IEEE Transactions on Computers, vol. 41, No. 3, Mar. 1992.

Cheng, Robertazzi, Distributed Computation for a Tree Network with Communication Delays, IEEE Transactions on Aerospace and Electronic Systems, vol. 26, No. 3, May 1990.

Takesue, A Distributed Load–Balancing System and Its Application to List–Processing Oriented Data–Flow Machine DFM, Systems and Computers in Japan vol. 18, No. 6, 1988.

(List continued on next page.)

*Primary Examiner*—Thomas C. Lee
*Assistant Examiner*—Moustafa Mohamed Meky
*Attorney, Agent, or Firm*—James C. Pintner

[57] ABSTRACT

A method is described of operating a computer in a network of computers using an improved load balancing technique. Logical links are generated between the computer and other computers in the network so that a tree structure is formed, the computer being logically linked to one computer higher up the tree and a number of computers lower down the tree. Stored information is maintained in the computer regarding the current load on the computer and the load on at least some of the other computers in the network by causing the computer periodically to distribute the information to the computers to which it is logically linked, and to receive from the computers similar such information and to update its own information in accordance therewith, so that the information can be used to determine a computer in the network that can accept extra load. A sender-initiated embodiment of the invention includes the further step of, when the computer is overloaded, using the information to determine a computer that can accept extra load and transferring at least one task to that computer. The load balancing technique is scalable, fault tolerant, flexible and supports clustering, thus making it suitable for use in networks having very large numbers of computers.

35 Claims, 6 Drawing Sheets

OTHER PUBLICATIONS

A. Barak and A. Shiloh, A Distributed Load-balancing Policy for a Multicomputer, Software-Practice & Experience, vol. 15(9), 901–913, Sep. 1985.

K. Shin and Y. C. Chang, Load Sharing in Distributed Real-Time Systems with State-Change Braodcasts, IEEE Transactons on Computers, vol. 38, No. 8, Aug. 1989, pp. 1124–1142.

F. C. H. Lin, R. M. Keller, Gradient Model: A Demand-Driven Load Balancing Scheme, CH2293-9/86/0000/0329, pp. 329–336, 1986.

5,539,883

LOAD BALANCING OF NETWORK BY MAINTAINING IN EACH COMPUTER INFORMATION REGARDING CURRENT LOAD ON THE COMPUTER AND LOAD ON SOME OTHER COMPUTERS IN THE NETWORK

This is a continuation of application Ser. No. 07/968,713 filed on Oct. 30, 1992 now abandoned.

FIELD OF THE INVENTION

The invention relates to methods of operating computers in networks and to computers capable of operating in networks.

BACKGROUND OF THE INVENTION

Local area networks of computers are an indispensable resource in many organisations. One problem in a large network of computers is that it is sometimes difficult to make efficient use of all the computers in the network. Load sharing or balancing techniques increase system throughput by attempting to keep all computers busy. This is done by off-loading processes from overloaded computers to idle ones thereby equalising load on all machines and minimising overall response time.

Load balancing methods can be classified according to the method used to achieve balancing. They can be 'static' or 'dynamic' and 'central' or 'distributed'.

In static load balancing, a fixed policy—deterministic or probabilistic—is followed independent of the current system state. Static load balancing is simple to implement and easy to analyse with queuing models. However, its potential benefit is limited since it does not take into account changes in the global system state. For example, a computer may migrate tasks to a computer which is already overloaded.

In dynamic schemes the system notes changes in its global status and decides whether to migrate tasks based on the current state of the computers. Dynamic policies are inherently more complicated than static policies since they require each computer to have knowledge of the state of other computers in the system. This information must be continuously updated.

In a central scheme one computer contains the global state information and makes all the decisions. In a distributed scheme no one computer contains global information. Each computer makes migration decisions based on the state information it has.

Load-balancing methods can be further classified as 'sender-initiated' and 'receiver-initiated'. In sender-initiated policies an overloaded computer seeks a lightly loaded computer. In receiver-initiated policies lightly loaded computers advertise their capability to receive tasks. It has been shown that if costs of task-transfer are comparable under both policies then sender-initiated strategies outperform receiver-initiated strategies for light to moderate system loads, while receiver-initiated schemes are preferable at high system loads.

Conventionally, a dynamic load balancing mechanism is composed of the following three phases:
1. Measuring the load of the local machine.
2. Exchanging local load information with other machines in the network.
3. Transferring a process to a selected machine.

Local load can be computed as a function of the number of jobs on the run queue, memory usage, paging rate, file use and I/O rate, or other resource usage. The length of the run queue is a generally accepted load metric.

The receipt of load information from other nodes gives a snapshot of the system load. Having this information, each computer executes a transfer policy to decide whether to run a task locally or to transfer it to another node. If the decision is to transfer a task then a location policy is executed to determine the node the task should be transferred to.

If a load balancing method is to be effective in networks having large numbers of computers it must be scalable, in the sense that network traffic increases linearly with the size of the network, flexible so that computers can be easily added to or removed from the network, robust in the event of failure of one or more of the computers, and must support to some degree clustering of the computers.

Centralised methods, though attractive due to their simplicity, are not fault-tolerant. The central computer can detect dead nodes and it takes one or two messages to re-establish connection. However, if the central node fails, the whole scheme falls apart. Load balancing configuration can be re-established by maintaining a prioritised list of alternative administrators in each node or by implementing an election method to elect a new centralised node. When a central node fails, other nodes switch to the new central node. This enhancement, however, increases the management complexity and cost of the method.

In addition, management overhead for a centralised method is unacceptably large. As the number of nodes increases, the time spent by the central node in handling load information increases, and there must come a point at which it will overload.

Several prior art load balancing methods are both dynamic and distributed.

For example, in the method described in Barak A. and Shiloh A. SOFTWARE—PRACTICE AND EXPERIENCE, 15(9):901–913, September 1985 [R1], each computer maintains a fixed size load vector that is periodically distributed between computers. Each computer executes the following method. First, the computer updates its own load value. Then, it chooses a computer at random and sends the first half of its load vector to the chosen computer. When receiving a load vector, each computer merges the information with its local load vector according to a predefined rule.

A problem with this method is that the size of the load vector has to be chosen carefully. Finding the optimal value for the load vector is difficult and it must be tuned to a given system. A large vector contains load information for many nodes. Thus, many nodes will know of a lightly loaded node, increasing the chance that it will quickly receive many migrating processes and will overload. On the other hand, the size of the load vector should not be so small that load values do not propagate through the network in a reasonable time. For large number n of nodes in the network, the expected time to propagate load information through the network is $O(\log n)$.

The method described in R1 can handle any number of computers after tuning the length of the load vector. Therefore, the method is scalable. However, it is flexible only up to a point. Adding a small number of nodes to the network does not require any change. Adding a large number of nodes requires changing the size of the load vector in all computers, thus increasing the administrative overhead. The method is fault-tolerant and continues to work in spite of single failures, however there is no built-in mechanism for detecting dead nodes and updating information on them in the load vectors. Thus information about failed nodes is not propagated and other nodes may continue to migrate processes to them, with the result of decreased response time.

The number of communications per unit time is O(n). However, the method does not support clustering. When a node wants to off-load process to another node it chooses a candidate from its load vector. Since the information on nodes in the load vector of node p is updated from random nodes, the set of candidates for off-loading is a random subset of n and not a controlled set for p.

In Lin F. C. H. and Keller R. M. PROCEEDINGS OF THE 6TH INTERNATIONAL CONFERENCE ON DISTRIBUTED COMPUTING SYSTEMS, 329–336, May 1986 [R2], a distributed and synchronous load balancing method using a gradient model is disclosed. Computers are logically arranged in a grid and the load on the computers is represented as a surface. Each computer interacts solely with its immediate neighbours on the grid. A computer with high load is a 'hill' and an idle computer is a 'valley'. A neutral computer is one which is neither overloaded nor idle. Load balancing is a form of relaxation of the surface. Tasks migrate from hills towards valleys and the surface is flattened. Each computer computes its distance to the nearest idle computer and uses that distance for task migration.

An overloaded node transfers a task to its immediate neighbour in the direction of an idle node. A task continues to move until it reaches an idle node. If a former idle node is overloaded when a task arrives, the task moves to another idle node.

This method, though scalable, is only partially flexible. It is easy to add or remove nodes at the edge of the grid, but it is difficult to do so in the middle since the grid is fixed. To do this, reconfiguration is required, which increases the overhead inherent in the method. Detection of dead nodes is not easy. Since only changes of the state of a node are sent to its neighbours, a node's failure remains undetected until a job is transferred to it. Late detection delays migrating processes and, therefore, increases overall response time. In this method clustering is not supported. Each node transfers processes to one of its immediate neighbours which may transfer it in a different direction. The overloaded node has no control as to where the off-loaded processes will eventually execute. Management overhead to start the grid is low and the number of messages is O(n). Administrative overhead for reconfiguration is high since it requires changes in all neighbouring nodes for a failed node. In this method node overhead is high and network traffic increases because tasks move in hops rather than directly to an idle node and it takes long time to migrate a process.

The buddy set algorithm proposed in Shin K. G. and Chang Y. C. IEEE TRANSACTIONS ON COMPUTERS, 38(8), August 1989 [R3], aims for very fast load sharing. For each node two lists are defined: Its buddy set, the set of its neighbours, and its preferred list, an ordered list of nodes in its buddy set to which tasks are transferred. Each node can be in one of the following states: under-loaded, medium-loaded and overloaded. Each node contains the status of all nodes in its buddy set. Whenever the status of a node changes, it broadcasts its new state to all nodes in its buddy set. The internal order of preferred lists varies per node in order to minimise the probability that two nodes in a buddy set will transfer a task to the same node. When a node is overloaded it scans its preferred list for an under-loaded node and transfers a task to that node. Overloaded nodes drop out of preferred lists. Buddy sets and their preferred lists overlap, so processes migrate around the network.

Again, this method, though scalable in that the number of messages increases linearly with the number of computers in the network n, is not flexible. Adding or removing nodes from the network requires recomputation of the preferred lists in all nodes of the related buddy set. If a node is added to more than one buddy set the recomputation must be done for each node in each buddy set. Detection of dead nodes is difficult for the same reason as in the gradient model described in R2. Clustering is supported but reconfiguratio expensive since it requires recomputation of new buddy sets and preferred lists, as for adding and removing nodes. The administrative overhead inherent in the method is therefore high.

SUMMARY OF THE INVENTION

According to a first aspect of the present invention there is provided a method of operating a computer in a network of computers, the method comprising: generating logical links between the computer and other computers in the network so that a tree structure is formed, the computer being logically linked to one computer higher up the tree and a number of computers lower down the tree; and maintaining in the computer stored information regarding the current load on the computer and the load on at least some of the other computers in the network by causing the computer periodically to distribute the information to the computers to which it is linked, to receive from said computers similar such information and to update its own information in accordance therewith, so that the information can be used to determine computers in the network that can accept extra load.

The invention is applicable to both sender-initiated and receiver-initiated load balancing. A embodiment of the invention using a sender-initiated load balancing technique includes the further step of, when the computer is overloaded, using the information to determine a computer that can accept extra load and transferring at least one task to that computer.

There is further provided a method of operating a network of computers by operating each computer using the above method.

The generation of the logical links can be achieved by assigning a rank to each computer, no two computers being assigned the same rank, each computer being logically linked to one computer of lower rank and a number of computers of higher rank to form the tree structure.

The tree structure can be maintained if a computer fails, or is otherwise inoperative, by generating new logical links between each of the computers lower down the tree to which the failed computer was linked and other computers, which have capacity for accepting new downward links.

An improved load balancing technique is employed which has the property of scalability by limiting the communication load on each computer and the knowledge of the network topology which is required to be stored in each computer. The actions taken by each computer are thus independent of the total number of computers in the network.

Since the tree structure is dynamically built and maintained, the method is also flexible. Changing a tree configuration requires simply changing the ranking of the reconfigured computers. The new ranking files have to be consistent with existing ranking files to avoid cycles. A computer is reconfigured by logically disconnecting it so that it appears inoperative to its neighbours, replacing its configuration file, and letting it reconnect to the tree. A new configuration is achieved without disturbing other nodes on the tree and without disrupting local services.

Detection and reconnection of failed nodes is also provided for. If a computer higher up the tree does not respond within a certain time, each higher ranked computer previously connected to it tries to relink itself elsewhere in the tree. If it temporarily fails to do this, it acts as root of a disconnected sub-tree, and load balancing occurs within the sub-tree. Eventually, the flags marking nodes as already tried or dead will be reset, and the computer, which periodically tries to attach itself to the tree, will reconnect to the tree.

Advantageously, the periodic distribution of load information across the links of the tree is used by each computer to determine whether or not the computers to which it is linked are operational, each computer seeking, if the computer to which it is linked higher in the tree is not operational, to generate a new link with a computer having lower rank, having the capacity for new downward links, and being marked, if one of the computers lower in the tree to which it is linked is not operational, as having capacity to accept new downward links.

In a preferred form of the invention, the information stored in each computer contains a number of entries, each entry containing information regarding the load on a particular one of the computers in the network, i, the number of links in the tree separating it from the computer in which the information is stored, and the name (i.e., rank) of the computer, logically linked to the computer in which the information is stored, from which the entry was last received; and wherein, when each computer receives the similar information from a computer to which it is logically linked, the following steps are performed:

a) the number of links separation value in each entry of the received information is incremented by one;

b) entries in the received information which originated from the receiving computer are deleted;

c) entries in the information already stored in the receiving computer which were received from the sending computer are deleted;

d) the received information is merged with the information already stored in the receiving computer; and e) the merged information is sorted in ascending order of load, entries with equal load being sorted in ascending order of number of links separation from the receiving computer.

Before each distribution of information between computers, entries in the information relating to computers which have the same load and number of links separation from the computer can be randomly permuted, so that the probability that the same entry will appear first in the information stored in different computers is reduced. Also, if an entry corresponding to the computer appears first in its own sorted information, a counter can be attached to the entry and initialised to the negative value of the spare load capacity of the computer. The counter is incremented, if that entry is still first, whenever the information is distributed. If the counter becomes positive, that entry is removed from the information. The probability that the same entry will appear first in the information stored in different computers is thereby reduced.

In an advantageous form of the invention, the period of the periodic distribution of the information to a computer higher up the tree is related to the rate at which new tasks are created in the computer and/or the rate at which new tasks are created in the computers to which it is logically linked in the tree structure. This has the advantage that if one or more nodes suddenly become highly loaded, this information will spread more quickly throughout the network.

A further advantage of the method provided in the present invention is that the case where the overall load in the network increases steadily is handled gracefully. In such a case, when local load vectors are searched for a target computer, fewer candidates will be found and the number of migrations will decrease. When overall load decreases, more candidates will be found in the local load vectors and migrations will resume. In other words, the network performance degrades gracefully during network load saturation and does not crash, rather normal operation is resumed when overall load returns to normal.

Viewed from another aspect, the invention provides a computer capable of operating in a network of similar such computers, the computer comprising: means for identifying computers in the network to which the computer is logically linked in a tree structure; means for storing information regarding the load on the computer and at least some of the other computers in the network; means for sending said information to the computers to which the computer is logically linked in the tree structure; means for receiving similar information from said computers to which the computer is logically linked, and updating the stored information in accordance therewith; and means for selecting one of the other computers in the network having spare load capacity using said information and transferring tasks to the selected computer.

The computer preferably also includes means for accessing a stored list of all the computers in the network; means for selecting a computer from this list as a candidate neighbouring computer for linking in the tree structure; means for sending a message to the selected computer indicating a link request; means for establishing a logical link with the selected computer by updating the identifying means if a positive response from the selected computer is received; means for receiving messages from other computers indicating that a link is requested; means for determining, on receipt of such a link request message, whether or not there is capacity for establishing a downward link; and means for sending a positive response to the sender of the link request message if there is such capacity and for updating the identifying means accordingly.

There is also provided a network of such computers.

BRIEF DESCRIPTION OF THE DRAWINGS

An embodiment of the invention will now be described, by way of example only, with reference to the accompanying drawing, wherein.

DESCRIPTION OF THE PREFERRED EMBODIMENTS

This embodiment of the invention is composed of two main parts. The first part is tree building and maintenance, and the second part is the exchange and maintenance of load balancing information.

TREE BUILDING AND MAINTENANCE

Each computer in the network is assigned a unique rank which is used in building the tree. In the following the term "parent" will be used to refer to a computer of lower rank to which a computer can form an upward link and the term "child" will be used to refer to a computer of higher rank to which a computer can form a downward link.

Each computer has stored in it a configuration file that contains:

(i) the maximum number of direct descendants the computer can accept. These are referred to as children slots.

(ii) a list of computers and their respective ranks.

(iii) an ordered list of "favoured parent" nodes, FP. Favoured parents have lower rank than the current computer. The FP list is used by the computer to choose a parent node. The FP list is optional. It can be empty in which case a parent is chosen at random. The FP list includes a subset of all computers of lower rank.

(iv) the time to wait for parent and children responses.

(v) the time to wait to probe if a node is dead or alive.

A list of candidate parents for a computer CR, which will be referred to as the candidates range of P, limits the range of possible parents. Initially CR of each computer contains all the computers with rank less than the rank of the computer. A node is chosen as a parent only if it is in CR and in FP. If FP is empty or exhausted then only membership of CR is checked.

Each computer performs the following steps to build the tree. There is a request phase in which a computer chooses another computer and requests it to become a parent, and a receive phase in which the computer waits for a reply and responds to requests from other computers.

Figure 1A:
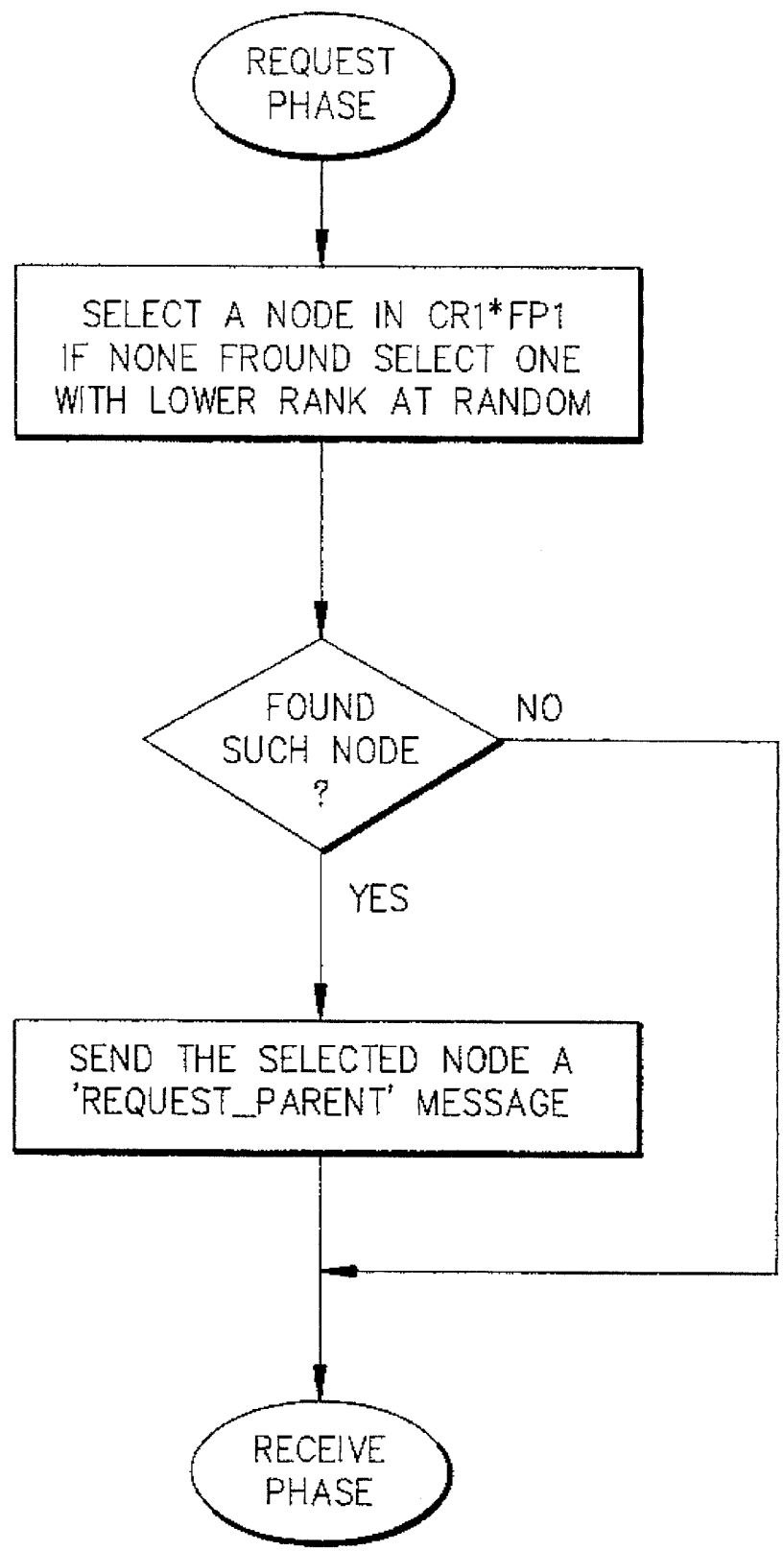
FIGS 1a, 1b, 1c and 1d are flow diagrams showing the request and receive phases of the tree generation.
Figure 1B:
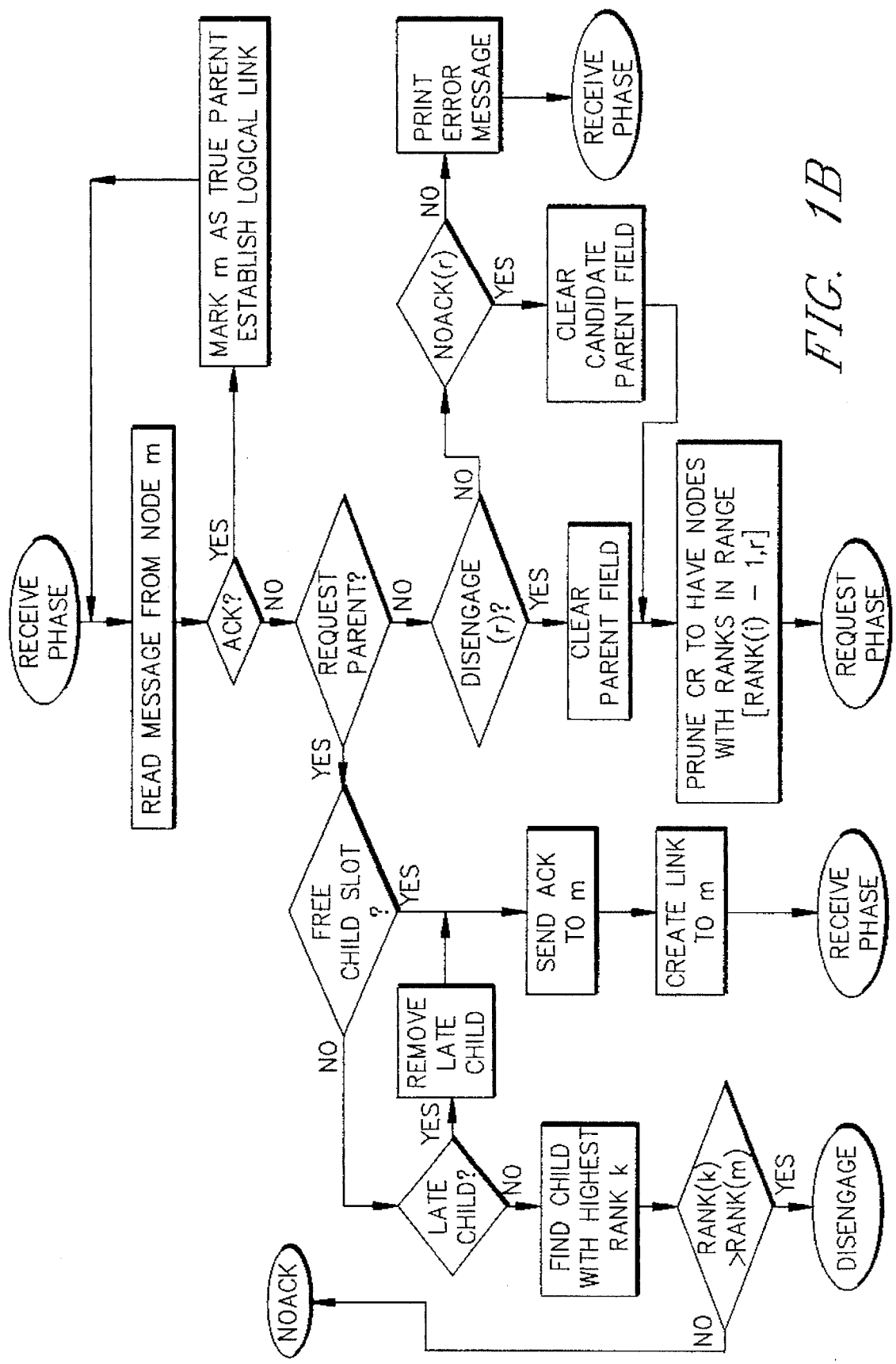
Figure 1C:
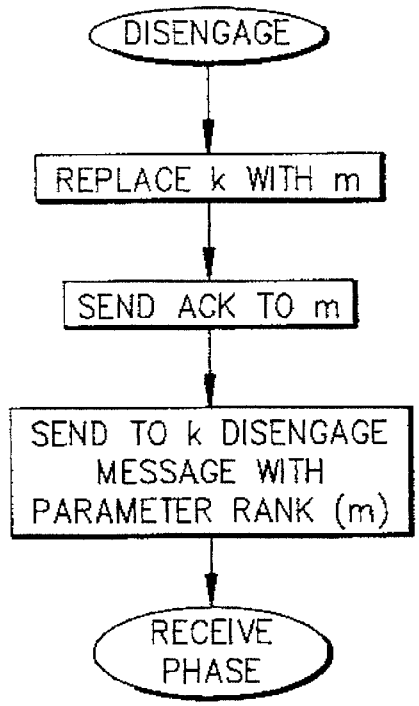
Figure 1D:
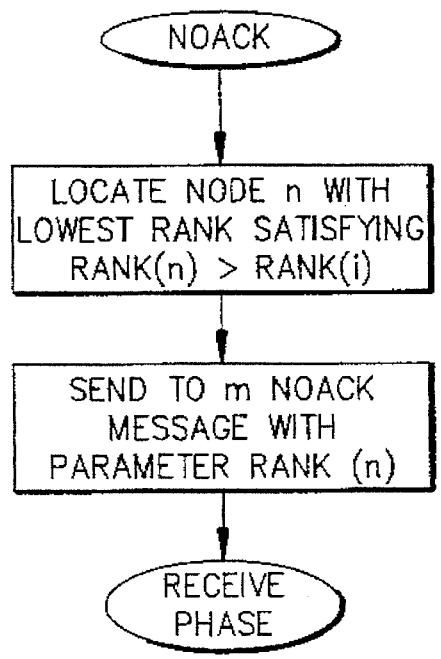

FIG 1a is a flow diagram showing the request phase of the tree generation and FIGS 1b, 1c and 1d are flow diagrams showing the receive phase of the tree generation.

REQUEST PHASE (FIG. 1a)

1. Each computer i picks another computer from its list of favoured parents FPi. If FPi is empty or all candidates in FPi failed, a computer with lesser rank is chosen at random. If the chosen computer j is not in CRi then the next one in FPi is chosen or another is randomly picked. If all nodes were tried unsuccessfully then the computer enters the receive phase.

2. i sends the chosen computer j a request_parent message and waits for messages from other computers.

3. If the candidate parent does not respond within a certain period of time, it is marked dead and i reenters the request phase.

RECEIVE PHASE (FIG. 1b)

1. If a request_parent message arrives from a computer m, then:
   a. If i has a free child slot, it accepts m's request and sends back an ack message
   b. If i has exhausted its allotted number of child slots then:
   (1) i scans its children for a late child as defined below. If a late child is found, then
   (a) the child is marked as dead and removed
   (b) this makes a child slot available
   (c) i sends m an ack message
   If a late child is not found, then
   (2) i finds the child k with highest rank.
   (3) If rank(k)>rank(m) then:
      (a) i accepts m as a child in place of k and sends m an ack message.
      (b) i sends k a disengage message containing rank(m) as a parameter.
   (4) If rank(k)<rank(m) then:
      (a) i locates in its list of computers a computer n with the lowest rank satisfying rank(n)>rank(i).
      (b) i sends m a noack message containing rank(n) as a parameter.

2. If a disengage message with parameter r arrives, then:
   a. i clears its candidate parent field
   b. i removes the computer with ranks outside the range [rank(i)–1,r] from CR and starts looking for a new parent, i.e., enters request phase.

3. If ack arrives from candidate parent, then the computer records the candidate parent as a true parent.

4. If a noack message with parameter r arrives, then i prunes CRi of the computers with ranks outside the range [rank(i)–1, r] and reenters the REQUEST phase.

Figure 2A:
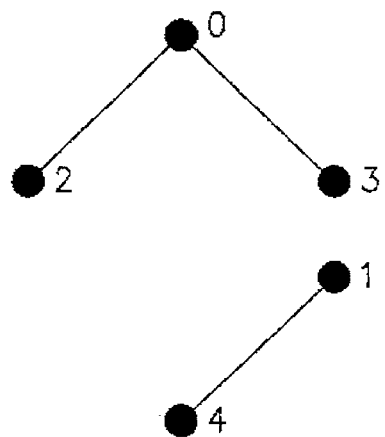
FIGS 2a, 2b and 2c show stages of the tree generation according to the present invention.

As an example of tree generation, consider five computers with ranks 0 to 4 where each can accept two children. Due to random choice of parents, the method can reach the stage shown in FIG 2a.

Figure 2B:
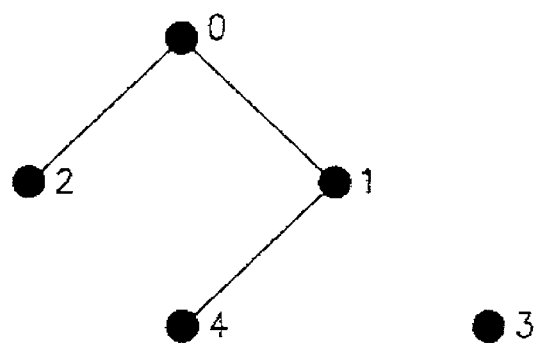

Computer 1 can choose only computer 0 as a parent, but computer 0 has already two children. Therefore, the method replaces child 3 of computer 0 with computer 1 and sends computer 3 a disengage message with parameter 1. Thus the situation pictured in FIG. 2b is reached.

Figure 2C:
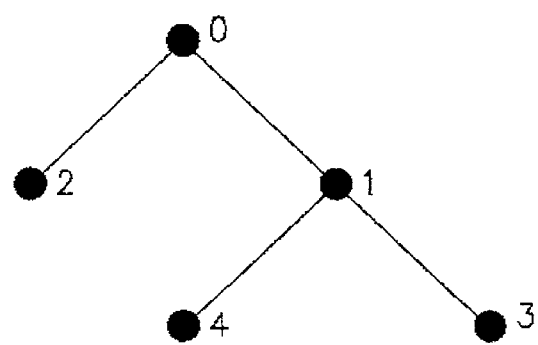

Node 3 searches for a parent in the range 2 to 1 and picks, say, 1 as parent. The resulting tree appears in FIG. 2c.

If all nodes are alive and there are no late children, then the tree generation terminates with one tree.

The above tree generation may build unbalanced trees or trees with many nodes having only one child. However, it has been found that the load balancing method is insensitive to the topology of the tree.

Tree maintenance is required to detect dead nodes, to add new nodes, or to reconnect rebooted nodes. It is necessary because nodes fail and nodes are sometimes shut down for maintenance. In this embodiment of the invention such cases are handled in the following way.

1. Each computer periodically sends an update_up message to its parent and waits for an update_down message.

2. If no response arrives within a specified period of time the parent is marked dead and the computer looks for a new parent.

3. If an update_up message arrives from a child, the node responds with an update_down message.

4. If no update_up message arrives from a child within a specified period of time, the child is marked late.

5. If an update_up message arrives from a late child, then the late flag for that child is reset, and the node responds with an update_down message.

6. When a computer is rebooted or added to the network, it looks for a parent, i.e., it enters the request phase.

7. Each computer flags computers already tried and those marked dead. Periodically these flags are cleared, and CR is reset to contain all computers with lesser rank. Thus rebooted nodes can be probed again.

Figure 3A:
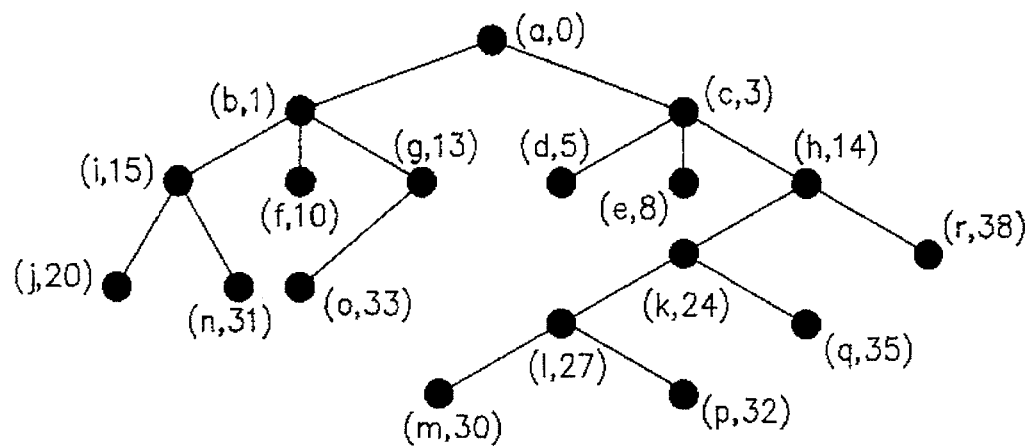
FIGS 3a, 3b and 3c illustrate an example of tree maintenance in the embodiment of the invention.

As an example, consider a tree of 18 nodes labelled a to r as shown in FIG. 3a.

Figure 3B:
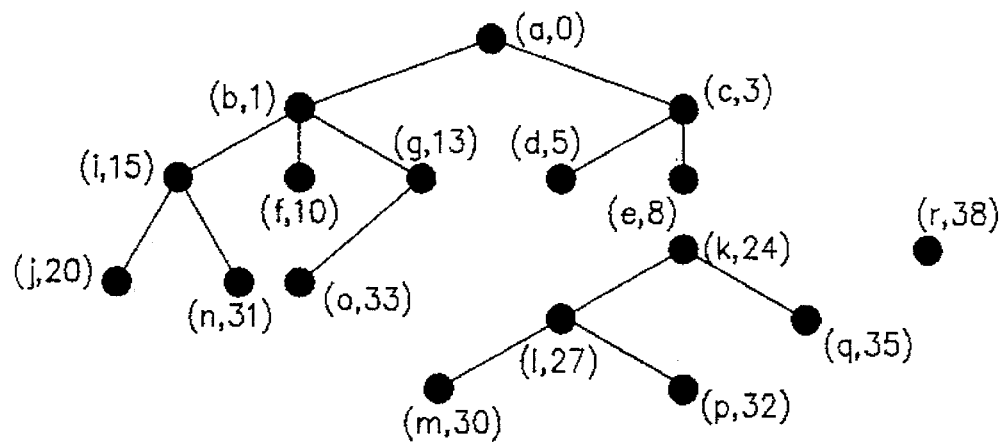

If node h fails, then after a predefined period of time, its parent c will mark it as late and ignore it, since it did not receive an update_up message. Nodes k and r will start looking for new parents, since no update_down message arrived. The network now comprises a number of separate trees as shown in FIG. 3b.

Figure 3C:
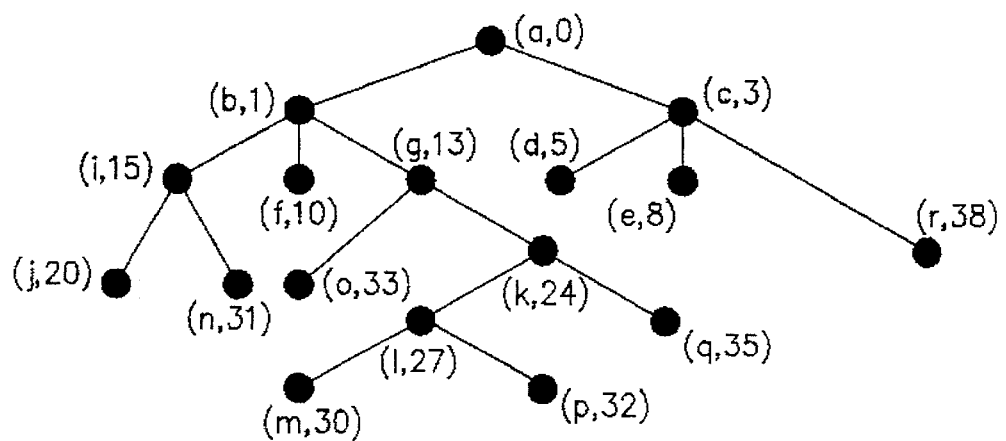

The nodes k and r look for a new parent in their FP. If their FP is empty, they choose a parent at random. The new tree may look like the one in FIG. 3c, with node k having node g as its new parent and node r having node c as its new parent.

The tree generation together with the tree maintenance mechanism ensure that the computers in the network generally will be arranged in a single tree structure. To see that this is true in the case of a node failing, consider an arbitrary tree in which node k fails or is otherwise inoperational. k's parent will mark it as late, and k's children will mark it as dead. Assume m was a child of k. Therefore, m looks for a new parent. There are three possibilities:

1. m finds a node which can accept it as a child. Thus, a single tree is formed.

2. m picks k's parent as a candidate and there are no free slots. In this case the slot of k marked as late is used and k is marked as dead. Again, a single tree is formed.

3. m does not find a node which can accept it as child. This can happen only if the nodes which would have accepted it (there is at least one, i.e., m-1) are marked as already tried or as dead. In this case the network temporarily comprises a number of sub-trees rather than a single tree. This state will end when all these flags are reset (step 7 of the maintenance mechanism) and then m will try again and will find a parent.

The above reasoning is applicable for all the children of k.

EXCHANGE AND MAINTENANCE OF INFORMATION

The number of jobs on the run queue is generally accepted as a suitable load metric. A node is considered overloaded if the length of the run queue exceeds a predefined threshold, overload_mark. Since the quantity that is really of interest is how far the node is from its overload mark, a slightly different metric is used in this embodiment of the invention. In this embodiment of the invention, load is defined as length_of_run_queue-overload_mark. For example, if overload_markA=10 and overload_markB=8 and the length of run queue of nodes A and B are 5 and 4 respectively, then the loadA=–5 and loadB=–4. Thus, the load of B is higher than that of A.

In the following this metric will be used for load. Whenever the term load is used, length_of_run_queue-overload_mark is meant.

Each computer in the network stores a sorted vector which holds information on other computers in the network. Each entry in the vector contains:

1) the rank of the computer 2) the local load of the computer 3) the distance in terms of the number of edges or links the load information has traversed, and 4) the last node that propagated this information (last node field).

The length of the load vector, i.e. the number of entries it contains, may vary from node to node.

Load information is distributed over the network in the following way:

1. Periodically, each computer samples its load L, sorts its load vector using the new value of L, and sends the load vector to its parent in an update_up message. The update_up message is also used as the indication that the node is operational for the purposes of tree maintenance.

2. When an update_up message is received by node m from node k, a. The distance of each entry in the received load vector is incremented by 1.

b. All entries in the received load vector which originated from receiving node m are deleted.

c. All entries in the load vector which originated from the sending node k are deleted.

d. The distances of entries (computers) which appear in both the local vector and the received vector are compared:

(1) If the distance of local entry is greater or equal to the distance of the received entry then the local entry is deleted.

(2) If the distance of the received entry is greater than the distance of the local entry then the received entry is deleted.

e. The last node field in the entries of the received vector is set to be the sending node k.

f. The received load vector is merged with the local load vector.

3. A parent sends its new load vector to the child who sent the update_up message. This message is an update_down message which again is used as an indication that the parent is operational in the tree maintenance message.

4. When an update_down message arrives, the receiving child processes the received load vector in the same way as described in step 2.

The update_down messages propagate information received by each node from the nodes to which they are linked in the tree structure. Thus children share information by passing it up to the parent who passes it down to the other children. By propagating load information up and down the tree, information on under-loaded nodes in another sub-tree can reach any node. Due to the fixed size of the load vector, each computer holds information on a sub-set of the computers that are least loaded.

The load information in a load vector is only an approximation of the real load on any particular computer, since by the time it reaches another node the load of the originating computer may have changed.

The 'update interval' is defined as the time interval between successive load distributions, i.e., update_up messages. This interval significantly influences the results of load balancing. Too large a value renders the load information of the current node in other nodes inaccurate. Migration decisions based on this information result in many rejections due to the inaccuracy of the information. Too small a value, i.e., a higher update rate, increases the overhead of the method and response time is degraded. The update rate (1/update_interval) should be proportional to the rate of generation of local processes and should change as this rate changes. In addition, there is another factor which has to be considered. It has to be ensured that the update rate of the current node does not slow down the propagation of information from its children to its parent, and vice versa. This will happen if the rate of the current node is low and that of its children or its parent is high. Therefore, the update rates of the immediate neighbours have also to be considered.

The effective_rate of a node is defined as the result of a rate calculation function based on these two factors.

In this embodiment of the invention the following function is used. Initially the effective rate of each node is set to the birth rate of local processes. For each node p the following quantities are computed:

a) $rate_1 = local\_birth\_rate_p$, Localbirthrate$_p$ is computed as an average over a sliding time window.

b) $rate_2 = \max\{effective\_rate_n\}/\alpha$ for all immediate neighbours n of p. $\alpha$ is an attenuation factor determined by computer simulation experiments as described below.

The effective_rate of p is given by:

effective_rate$_p$=max{rate$_{1, \, rate2}$}

In computer simulation experiments, it was found that values of α in the range 1.4 to 2.0 gave good results for networks with evenly distributed load and networks with regions of high load.

When a computer is overloaded, it searches its local load vector for the first entry indicating a computer that can accept extra load, and transfer one or more tasks directly to it. The load entry of the target computer in the load vector is updated and the load vector is re-sorted. If the target computer cannot for whatever reason accept extra load, the sender is notified. In this case the sender deletes that entry from the load vector, retrieves the next entry and use it as a new target. If no node can accept extra load then no migration is initiated.

Thus, the location policy, i.e., finding a target node, depends on the sort criterion used to sort the load vector. Since load information is propagated in hops over the tree, the farther away a node is, the less accurate is its information. Therefore, in this embodiment of the evaluation the load vector is sorted according to load and distance. Entries are first sorted according to their load. Entries with equal load are then sorted in ascending order of distance.

A node which is lightly loaded for a long time may appear as the first entry in the load vector of many nodes. This may cause many nodes to migrate processes to that node, thus flooding it and creating a bottleneck. Two approaches can be used to avoid this problem.

An equivalence set of nodes can be defined in the load vector as those nodes with the same load and distance. For example all nodes with load −1 and distance 2 are in the same equivalence set. In this case, the sort criterion ensures that all the nodes in the same equivalence set are grouped together in the vector. Before a load vector is distributed (by update_up or update_down message) the first equivalence set in the vector undergoes permutation. This reduces the probability that the same node will appear in many load vectors.

In addition, whenever a lightly-loaded node appears first in its own load vector for the first time, a counter is attached to the entry and initialised to be equal to the load of the lightly loaded node which is always less than zero. Whenever the vector is distributed, if that entry is still first, then the counter is incremented. If the counter becomes positive that entry is removed from the vector. Thus the number of nodes which are aware of the lightly loaded node is limited and the probability of flooding reduced.

Initiation of process migration depends on the frequency at which the local load is checked and on the value of the local load. The decision when to check a node's load status depends on the chosen policy. There are a number of possible policies, including the following:

1. Periodic The local load is tested after sending update_up message, i.e., the local load sampling is synchronised with the update_up message.
2. Event driven The local load is tested whenever a local process is added to the run queue.

The decision when to declare a computer overloaded, i.e., where to place the overload mark, influences the performance of the method. Placing the overload mark too low may cause too many migrations without improving response time. Placing it too high may degrade response time. The overload mark value needs to be optimised for any particular system and the value may be different for computers in the network having different load capacities or for different job type profiles. The optimum value or values can be established in any given situation by the use, for example, of appropriate computer simulation experiments or by a process of trial and error.

A controlled clustering of nodes can be achieved by an appropriate assignment of rank in the configuration files of each node.

For example, if there are eleven computers a to k, and it is required to form clusters of four and seven computers as follows:

| a b c d | e f g h i j k |
|---|---|
| 1st cluster | 2nd cluster | then the following steps are performed to rank the nodes.

1. Each cluster is ranked separately. For example,

| a | b | c | d | e | f | g | h | i | j | k |
|---|---|---|---|---|---|---|---|---|---|---|
| 1 | 2 | 0 | 3 | 5 | 6 | 0 | 1 | 2 | 3 | 4 |

2. Each cluster is taken in turn, and rank of each node is increased by the number of nodes in previous clusters. For example, if the second cluster is chosen first,

| a | b | c | d | e | f | g | h | i | j | k |
|---|---|---|---|---|---|---|---|---|---|---|
| 8 | 9 | 7 | 10 | 5 | 6 | 0 | 1 | 2 | 3 | 4 |

Cluster configuration is achieved by assigning different ranking files to the computers. Each computer except the one with lowest rank in a cluster, stores a ranking list that contains ranks of nodes in its cluster and not those outside the cluster. The computer with the lowest rank stores the ranking list with nodes in other clusters.

Figure 4A:
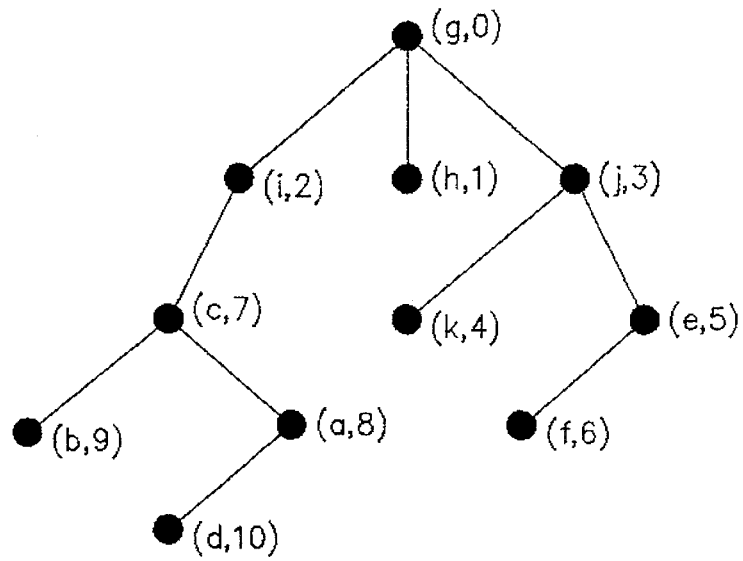
FIGS 4a, 4b and 4c illustrate the handling of clustering of nodes in the embodiment of the invention.

Nodes in a cluster will therefore connect to each other since they are not aware of other nodes. Only the node with the lowest rank will connect to a node in another cluster, because it cannot connect to another node in the cluster. FIG. 4a shows a sample tree formed from the nodes in the above example.

Figure 4B:
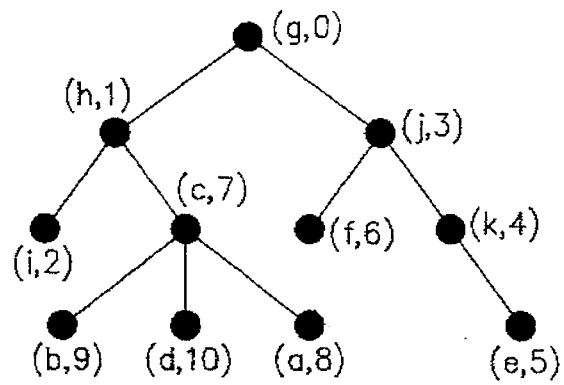

If the maximum number of children for c is three, and the favoured parent lists of a, b and d contain only c, the tree described in FIG. 4b may result.

Figure 4C:
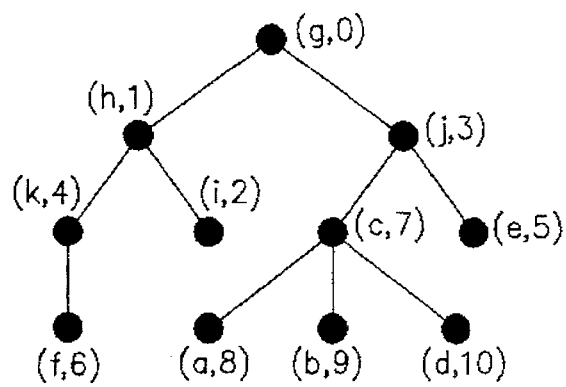

Placing j in the favoured parent list of c may generate the tree described in FIG. 4c.

Thus clustering is achieved in the embodiment of the invention by judicious choice of ranking files and favoured parents lists for each node.

Whilst the invention has been described in terms of an embodiment using a sender-initiated load balancing policy in which an overloaded node initiates the transfer of tasks, it will be clear to those skilled in the art that the invention could equally well be applied to a receiver-initiated scheme in which a lightly loaded computer initiates transfer of tasks from a heavily loaded computer to itself.

There has been described a method of operating a computer in a network and operating a network of computers using an improved load balancing technique which is scalable, fault tolerant, flexible and supports clustering thus making it suitable for use in networks having very large numbers of computers.

What is claimed is:

1. A method of operating a first computer in a network of computers, the method comprising the steps of:

generating logical links between the first computer and other computers in the network so that a tree structure is formed, the logical links including a link to one of the other computers higher up the tree and links to a number of computers lower down the tree; and maintaining in the first computer stored information regarding a current load on the first computer and a load on at least some of the other computers in the network, the step of maintaining including causing the first computer:

(i) periodically to distribute the information to the computers to which it is logically linked, (ii) to receive from said other computers similar such information, and (iii) to update its own information in accordance therewith, so that the information can be used to determine ones of the other computers in the network that can accept extra load:

wherein the step of maintaining includes maintaining information stored in the first computer, including a number of entries, each entry containing information regarding:

(i) a load on one of the other computers in the network, (ii) a number of links in the tree separating that other computer from the first computer, and (iii) the one of the other computers, which are linked to the first computer, from which the entry was last received; and wherein, the method further comprises the steps, when the first computer receives the similar information from on one of the other computers to which it is linked, of:

(a) incrementing a number of links value in each entry of the received similar information by one;

(b) deleting entries in the received information which originated from the other computer;

(c) deleting entries in the information already stored in the first computer which were received from the other computer;

(d) merging the received similar information with the information already stored in the first computer; and (e) sorting the merged information in ascending order of load, entries with equal load being sorted in ascending order of number of links separation from the first computer.

2. A method as claimed in claim 1, further comprising the step, when the first computer is overloaded, of using the information to determine a second computer that can accept extra load and transferring at least one task to the second computer.

3. A method as claimed in claim 1 further comprising the step, if a second computer higher up the tree, to which the first computer is logically linked, fails or is otherwise inoperative, of generating a new logical link to another computer in the network which has capacity for accepting new downward links.

4. A method as claimed in claim 1, wherein the step of maintaining includes:

(i) using the periodic distribution of load information to determine whether or not the other computers to which the first computer is linked in the tree are operational, and (ii) marking the first computer, if one of the other computers lower in the tree to which the first computer is linked is not operational, as having capacity to accept new downward links.

5. A method as claimed in claim 1, further comprising the step of randomly permuting entries in the information, the entries relating to computers which have the same load and number of links separation from the computer, prior to the step of maintaining by causing the computer periodically to distribute.

6. A method as claimed in claim 1, further comprising the steps, if an entry corresponding to the computer appears first in its own sorted information, of:

attaching a counter to the entry;

initializing the counter to negative value of a spare load capacity of the computer;

incrementing the counter, if that entry is still first, whenever the information is distributed; and removing that entry from the information, if the counter becomes positive;

whereby a probability that the same entry will appear first in the information stored in different computers is reduced.

7. A method as claimed in claim 1, wherein:

the step of causing periodically to distribute is executed according to a first period which includes a second period of periodic distribution of the information to the one computer higher up the tree; and the second period depends on a rate at which new tasks are created in the computer.

8. A method as claimed in claim 7, wherein, in the step of causing, the first period depends on a rate at which new tasks are created in the other computers to which the first computer is logically linked in the tree structure.

9. A method as claimed in claim 1, wherein, in the step of causing periodically to distribute, the information is distributed to one of the other computers which is lower in the tree in response to receipt by the first computer of the similar information from the other computer lower in the tree.

10. A method of operating a network of computers, comprising the step of:

operating each computer of the network using the method as claimed in claim 1.

11. A method as claimed in claim 10, wherein the step of generating logical links includes assigning a rank to each computer, no two computers being assigned the same rank, each computer being linked to one computer of lower rank and a number of computers of higher rank to form the tree structure.

12. A computer comprising:

means for operating in a network of similar such computers, means for logically linking the computer to similar such computers in a tree structure network, and for identifying the similar such computers;

means for storing information regarding a load on the computer and loads on at least some of the similar such computers in the network;

means for sending said information to the similar such computers to which the computer is logically linked;

means for receiving similar information from said similar such computers to which the computer is logically linked, and for updating the stored information in accordance therewith; and means for selecting one of the similar such computers in the network having spare load capacity from said information, and for transferring tasks to the selected computer:

wherein the means for storing includes means for maintaining information stored in the first computer, including a number of entries, each entry containing information regarding:

(i) a load on one of the other computers in the network, (ii) a number of links in the tree separating that other computer from the first computer, and (iii) the one of the other computers, which are linked to the first computer, from which the entry was last received; and wherein, the computer further comprises means, operable when the first computer receives the similar information from one of the other computers to which it is linked, for:

(a) incrementing a number of links value in each entry of the received similar information by one;

(b) deleting entries in the received information which originated from the other computer;

(c) deleting entries in the information already stored in the first computer which were received from the other computer;

(d) merging the received similar information with the information already stored in the first computer; and (e) sorting the merged information in ascending order of load, entries with equal load being sorted in ascending order of number of links separation from the first computer.

13. A computer as claimed in claim 12, further comprising:

means for accessing a stored list of all the computers in the network;

means for selecting a computer from the list as a candidate neighboring computer for linking in the tree structure;

means for sending a message to the selected computer indicating a link request;

means for establishing a logical link with the selected computer by updating the means for identifying if a positive response from the selected computer is received;

means for receiving a message from one of the similar such computers indicating that a link is requested; and means for determining, on receipt of such a link request message, whether or not there is capacity for establishing a downward link, for sending a positive response to the one similar such computer which sent the link request message if there is such capacity and updating the identifying means accordingly.

14. A network of computers comprising a plurality of computers as claimed in claim 13.

15. A network of computers comprising a plurality of computers as claimed in claim 12.

16. A computer as claimed in claim 12, further comprising means, operable when the first computer is overloaded, for using the information to determine a second computer that can accept extra load and transferring at least one task to the second computer.

17. A computer as claimed in claim 12 further comprising means, operable when a second computer higher up the tree, to which the first computer is logically linked, fails or is otherwise inoperative, for generating a new logical link to another computer in the network which has capacity for accepting new downward links.

18. A computer as claimed in claim 12, wherein the means for storing includes:

(i) means for using the periodic distribution of load information to determine whether or not the other computers to which the first computer is linked in the tree are operational, and (ii) means for marking the first computer, if one of the other computers lower in the tree to which the first computer is linked is not operational, as having capacity to accept new downward links.

19. A computer as claimed in claim 12 further comprising means for randomly permuting entries in the information, the entries relating to computers which have the same load and number of links separation from the computer.

20. A computer as claimed in claim 12, further comprising means, operable when an entry corresponding to the computer appears first in its own sorted information, for:

attaching a counter to the entry;

initializing the counter to negative value of a spare load capacity of the computer;

incrementing the counter, if that entry is still first, whenever the information is distributed; and removing that entry from the information, if the counter becomes positive;

whereby a probability that the same entry will appear first in the information stored in different computers is reduced.

21. A computer as claimed in claim 12, wherein:

the means for causing periodically to distribute is operable according to a first period which includes a second period of periodic distribution of the information to the one computer higher up the tree; and the second period depends on a rate at which new tasks are created in the computer.

22. A computer as claimed in claim 21, wherein, in the means for causing, the first period depends on a rate at which new tasks are created in the other computers to which the first computer is logically linked in the tree structure.

23. A computer as claimed in claim 12, wherein the means for causing periodically to distribute includes means for distributing the information to one of the other computers which is lower in the tree in response to receipt by the first computer of the similar information from the other computer lower in the tree.

24. A network of computers, comprising a plurality of computers as claimed in claim 12.

25. A network as claimed in claim 24, wherein, for each computer, the means for generating logical links includes means for assigning a rank to each computer, no two computers being assigned the same rank, each computer being linked to one computer of lower rank and a number of computers of higher rank to form the tree structure.

26. A computer program product, for use with a computer, comprising:

a recording medium;

means, recorded on the recording medium, for directing the computer to operate in a network of similar such computers, means, recorded on the recording medium, for directing the computer to logically link the computer to similar such computers in a tree structure network, and for identifying the similar such computers;

means, recorded on the recording medium, for directing the computer to store information regarding a load on the computer and loads on at least some of the similar such computers in the network;

means, recorded on the recording medium, for directing the computer to send said information to the similar such computers to which the computer is logically linked;

means, recorded on the recording medium, for directing the computer to receive similar information from said similar such computers to which the computer is logically linked, and for directing the computer to update the stored information in accordance therewith; and means, recorded on the recording medium, for directing the computer to select one of the similar such computers in the network having spare load capacity from said information, and for transferring tasks to the selected computer;

wherein the means for directing to store includes means, recorded on the recording medium, for directing the computer to maintain information stored in the first computer, including a number of entries, each entry containing information regarding:
  (i) a load on one of the other computers in the network,
  (ii) a number of links in the tree separating that other computer from the first computer, and
  (iii) the one of the other computers, which are linked to the first computer, from which the entry was last received; and wherein, the computer further comprises means, recorded on the recording medium, operable when the first computer receives the similar information from one of the other computers to which it is linked, for directing the computer:
  (a) to increment a number of links value in each entry of the received similar information by one;
  (b) to delete entries in the received information which originated from the other computer;
  (c) to delete entries in the information already stored in the first computer which were received from the other computer;
  (d) to merge the received similar information with the information already stored in the first computer; and
  (e) to sort the merged information in ascending order of load, entries with equal load being sorted in ascending order of number of links separation.

27. A computer program product as claimed in claim 26, further comprising:

means, recorded on the recording medium, for directing the computer to access a stored list of all the computers in the network;

means, recorded on the recording medium, for directing the computer to select a computer from the list as a candidate neighboring computer for linking in the tree structure;

means, recorded on the recording medium, for directing the computer to send a message to the selected computer indicating a link request;

means, recorded on the recording medium, for directing the computer to establish a logical link with the selected computer by updating the means for directing to identify if a positive response from the selected computer is received;

means, recorded on the recording medium, for directing the computer to receive a message from one of the similar such computers indicating that a link is requested; and means, recorded on the recording medium, for directing the computer to determine, on receipt of such a link request message, whether or not there is capacity for establishing a downward link, for directing the computer to send a positive response to the one similar such computer which sent the link request message if there is such capacity, and for directing the computer to update the identifying means accordingly.

28. A computer program product as claimed in claim 26, further comprising means, recorded on the recording medium, operable when the first computer is overloaded, for directing the computer to use the information to determine a second computer that can accept extra load and for directing the computer to transfer at least one task to the second computer.

29. A computer program product as claimed in claim 26 further comprising means, recored on the recording medium, operable when a second computer higher up the tree, to which the first computer is logically linked, fails or is otherwise inoperative, for directing the computer to generate a new logical link to another computer in the network which has capacity for accepting new downward links.

30. A computer program product as claimed in claim 26, wherein the means for directing to store includes:
  (i) means, recorded on the recording medium, for directing the computer to use the periodic distribution of load information to determine whether or not the other computers to which the first computer is linked in the tree are operational, and
  (ii) means, recorded on the recording medium, for directing the computer to mark the first computer, if one of the other computers lower in the tree to which the first computer is linked is not operational, as having capacity to accept new downward links.

31. A computer program product as claimed in claim 26 further comprising means, recorded on the recording medium, for directing the computer to randomly permute entries in the information, the entries relating to computers which have the same load and number of links separation from the computer.

32. A computer program product as claimed in claim 26, further comprising means, recorded on the recording medium, operable when an entry corresponding to the computer appears first in its own sorted information, for directing the computer:

to attach a counter to the entry;

to initialize the counter to negative value of a spare load capacity of the computer;

to increment the counter, if that entry is still first, whenever the information is distributed; and to remove that entry from the information, if the counter becomes positive;

whereby a probability that the same entry will appear first in the information stored in different computers is reduced.

33. A computer program product as claimed in claim 26, wherein:

the means for directing to cause periodically to distribute is operable according to a first period which includes a second period of periodic distribution of the information to the one computer higher up the tree; and the second period depends on a rate at which new tasks are created in the computer.

34. A computer program product as claimed in claim 33, wherein, in the means for directing to cause, the first period depends on a rate at which new tasks are created in the other computers to which the first computer is logically linked in the tree structure.

35. A computer program product as claimed in claim 26, wherein the means for directing to cause periodically to distribute, includes means, recorded on the recording medium, for directing the computer to distribute the information to one of the other computers which is lower in the tree in response to receipt by the first computer of the similar information from the other computer lower in the tree.

* * * * *